United States Patent [19]

Rinehart

[11] 4,169,195

[45] Sep. 25, 1979

[54] PROCESS FOR PREPARING ALPHA-METHYLSTYRENE POLYMERS

[75] Inventor: Michael K. Rinehart, Parkersburg, W. Va.

[73] Assignee: Borg-Warner Corporation, Chicago, Ill.

[21] Appl. No.: 881,086

[22] Filed: Feb. 24, 1978

Related U.S. Application Data

[63] Continuation-in-part of Ser. No. 755,330, Dec. 29, 1976, abandoned.

[51] Int. Cl.$^2$ .................... C08F 212/06; C08F 212/10
[52] U.S. Cl. .................................................. 526/342
[58] Field of Search ........................................ 526/342

[56] References Cited

U.S. PATENT DOCUMENTS

| | | | |
|---|---|---|---|
| 3,010,936 | 11/1961 | Irvin | 526/342 |
| 3,201,375 | 8/1965 | Finestone | 526/342 |
| 3,491,071 | 1/1970 | Lanzo | 526/342 |
| 3,931,128 | 1/1976 | Takizawa et al. | 526/342 |

*Primary Examiner*—Harry Wong, Jr.
*Attorney, Agent, or Firm*—Richard J. Schlott

[57] ABSTRACT

Polymers containing greater than 60 wt% alpha methylstyrene, from 28 to 35 wt% acrylonitrile and from 0 to 7 wt% styrene having excellent color and usefully high molecular weights result from suspension polymerization of the monomer mixture above 90° C. and employing monomer phase to aqueous phase ratios greater than 1:1.5.

1 Claim, No Drawings

PROCESS FOR PREPARING ALPHA-METHYLSTYRENE POLYMERS

CROSS-REFERENCE TO RELATED APPLICATIONS

This application is a continuation-in-part of Ser. No. 755,330, filed Dec. 29, 1976, now abandoned.

BACKGROUND OF THE INVENTION

This invention relates to a process for preparing polymers of alpha methylstyrene. More particularly this invention relates to a suspension polymerization process for producing polymers of alpha methylstyrene, acrylonitrile and styrene in bead form at a high level of monomer conversion, having high molecular weight and low residual monomer content.

Conventional suspension or "bead" polymerization processes are known for the preparation of a variety of polymers such as polystyrene and styrene-acrylonitrile copolymers. These methods generally are characterized by incomplete conversion of the monomers, and consequently the resulting bead polymers are recovered containing varying high levels of residual monomer present. A variety of techniques have been developed to avoid the presence of unreacted monomer in the bead product, such as for example that shown in U.S. Pat. No. 3,288,731 wherein the polymerization reaction mixture is treated with a strong base at a monomer-polymer conversion point of about 75–85 percent to remove the unreacted acrylonitrile prior to isolating the beads. This method produced bead products relatively free of residual acrylonitrile but the low conversions result in lowered yields, a substantial loss of monomers and a concommitant increase in production costs. Alternate approaches include the use of carefully programmed process temperatures to increase the level of conversion followed by steam distillation to remove unreacted monomers such as is taught in U.S. Pat. No. 3,491,071. This latter process, employing styrene, alpha methylstyrene and acrylonitrile, requires the use of programmed process temperatures followed by steam distillation of unreacted monomer (acrylonitrile) prior to 98% conversion. The use of programmed process temperatures and steam distillation of unreacted monomers adds substantially to the costs, and additionally does not avoid the loss of some monomer through incomplete conversion. Further, when applied to terpolymers wherein alpha methylstyrene comprises the largest weight fraction of the monomer mixture, conversion is low and the molecular weight of the resulting product is significantly decreased.

An efficient process for producing high molecular weight polymers from mixtures of alpha methylstyrene, acrylonitrile and styrene having high percentages of alpha-methylstyrene is clearly needed.

SUMMARY OF THE INVENTION

It has now been found that the suspension polymerization of mixtures of alpha methylstyrene, acrylonitrile and styrene having greater than 50 weight percent alpha methylstyrene, produces high molecular weight bead polymers in greater than 96% conversion, when carried out at an elevated temperature and employing a high ratio of monomer-to-aqueous phase. More particularly, the polymerization of monomer mixtures of alpha methylstyrene, acrylonitrile and styrene containing greater than 60 wt. percent alpha methylstyrene carried out at a temperature above 90° C. under suspension polymerization conditions with a monomer-to-aqueous phase ratio greater than about 1:1.5 results in monomer conversions of generally greater than 96% to polymers having a molecular weight greater than about 40,000 ($M\bar{n}$) without requiring the use of programmed reaction temperatures. The product bead polymers are of good color and low residual monomer content even though no steam distillation or vacuum removal of monomers is employed.

The polymers are prepared from monomer mixtures containing from 60 to 70 wt. percent alpha methylstyrene, from 35 to 28 wt. percent acrylonitrile and from 0 to 7 wt. percent styrene. The particular range of monomers employed is selected to provide an advantageous balance of the high heat distortion properties of alpha methylstyrene and the excellent chemical and solvent resistance imparted by acrylonitrile. These particular compositions and their desirable property characteristics have long been known in the art, and the compositions themselves are not regarded as part of this invention.

As is well known in the art, homopolymerization of alpha-methylstyrene proceeds at a very slow rate. However, the presence of even a small amount of styrene greatly accelerates the rate of polymerization. Accordingly, it is advantageous to employ a mixture of alpha methylstyrene and styrene in order to accelerate the polymerization reaction. However, preferably the styrene content will be kept to less than about 1 part styrene to about 9 parts alpha methylstyrene, since greater amounts do not significantly increase the polymerization rate, while the heat distortion temperature of the resulting polymeric product decreased as the proportion of styrene increases.

The polymerization process of this invention is carried out under suspension polymerization conditions, wherein the monomer mixture together with the requisite polymerization initiator is fed into a stirred polymerization reactor containing as the suspending medium water and a minor proportion suspension stabilizer or suspending agent.

The suspending agents useful are those conventionally employed for suspension polymerization including finely-divided inorganic salts such as calcium phosphate, talc or a variety of protective colloids including polyvinyl alcohol and the like. Inasmuch as the polymerization is run at elevated temperatures, the suspending aids which are the more effective at these temperatures will be preferred, including calcium phosphate. The suspension stability is further improved by the use of dispersing aids in the form of surfactants such as salts of alkyl aryl sulfonates and the like.

The amount of water employed is such that the ratio of monomer phase to water phase is greater than about 1:1.5, and preferably greater than about 1:1. As will be shown herein below, both the degree of conversion and the molecular weight of the final product increase with increasing monomer/water ratio, and below a ratio of about 1:1.5, the molecular weight of the product will be unacceptably low. At higher ratios, particularly at ratios at and above about 1:1, the molecular weight of the product increases to a useful level, and the degree of monomer conversion is increased to greater than 96%. As a practical matter, even though further increases result in further molecular weight improvements, monomer/water ratios in excess of about 1:0.5 become difficult to handle in conventional equipment due primarily to decreased suspension stability.

The organic phase of the reaction mixture will contain catalytic quantities of a free radical polymerization initiator such as a peroxy or azo compound, e.g. t-butyl perbenzoate, 2,5-dimethyl-2,5-bis(benzoyl peroxy) hexane, 1-cyano-1-(t-butyl azo) cyclohexane, 2-t-butylazo-2-thiophenoxy-4-methyl pentane and the like.

The polymerization temperature employed will be greater than 90° C., and more particularly from about 100° C. to about 125° C. Inasmuch as at these elevated temperatures both the monomers and the aqueous phase are volitile, the reaction will be carried out in a sealed reactor under autogenous or, more preferably under slightly elevated pressures by the addition of an inert gas such as nitrogen.

The light colored, high molecular weight products of this invention result by carrying out the reaction under the described high solids and elevated temperature conditions, and neither controlled reagent addition nor programmed temperatures are required. Further, unlike prior art processes, the very high levels of conversion that result obviate the need for steam distillation to remove unreacted monomers and low molecular weight reaction by-products.

The invention will be further understood by consideration of the following examples.

EXAMPLE 1

Polymerization at 1:1 monomer phase to aqueous phase. A 20 gallon pressure reactor was charged with a solution of 0.9 lbs of $Na_3PO_4$—$12H_2O$ in 37.5 lbs of water. The solution was stirred, heated to 65° C., and a solution of 0.683 lbs of $CaCl_2.2H_2O$ in 15.0 lbs of water was added, followed by a solution of 0.005 lbs of $CaCO_3$ and 0.003 lbs of Naccona[1] NRSF alkylaryl sulfonate surfactant in 15 lbs of water. After stirring 30 minutes, a mixture of 49.5 lbs of alpha-methylstyrene, 23.25 lbs of acrylonitrile, 2.25 lbs of styrene and 0.174 lbs of 2,5-dimethyl-2,5-bis(benzoylperoxy)hexane was added. The reactor was purged with nitrogen, and sealed under 50 psi nitrogen pressure. The stirred mixture was heated to 104° C. and held with stirring at that temperature for 24 hours. The mixture was then cooled to 48° C., and sufficient HCl was added to give a pH of 2.0. The bead product was isolated by centrifugation washed with water and air-dried at 71° C.

The product, obtained in 99% conversion, had the following non-aqueous volatile content:

Alpha methylstyrene: 0.50 wt%
Acrylonitrile: 0.23 wt%
Styrene: 0.04 wt%

The number average molecular weight of the product was 53,000, by Gel permeation chromatographic analysis.

EXAMPLE 2

The preparation of Example I was repeated. The product, after centrifuging and rinsing, was re-slurried in 200 parts demineralized water, then steam-sparged at atmospheric pressure for 8 hours, centrifuged and air-dried at 71° F.

The product, obtained in greater than 99% conversion, had a number average molecular weight of 53,000 and the following non-aqueous volatile content:

Alpha methylstyrene: 0.47 wt%
Acrylonitrile: 0.13 wt%
Styrene: 0.01 wt%

The products of Examples 1 and 2 were compression molded at 177° C., giving light yellow moldings essentially identical in color and hue.

It is thus apparent from the results of Examples 1 and 2 that high molecular weight products are obtainable from the high solids suspension polymerization process of this invention. Further, the products are produced in surprisingly high conversion, and have very low residual monomer content without resort to steam distillation or sparging.

EXAMPLE 3

The process of Example I was repeated, except that at the end of the 24 hour heating period, the temperature of the mixture was elevated to 130° C. and held for 4 hours before cooling and isolating the product. The bead product, again obtained in 99% conversion, had essentially the same residual monomer (non-aqueous volatiles) content as the product of Example I, demonstrating that extended reaction times at elevated temperatures do not further improve conversion or further lower the residual monomer content.

EXAMPLES 4-9

A series of runs were carried out using different ratios of monomer phase to aqueous phase. The formulations and results are summarized in Table I. The procedures employed were essentially those of Example 1, the conditions modified as given in Table I. The materials are given in parts by weight.

Table I

| Example No: | 4 | 5 | 6 | 7 | 8 | 9 |
|---|---|---|---|---|---|---|
| Materials | | | | | | |
| $H_2O$ | 300 | 180 | 122 | 122 | 82 | 55 |
| PVA[1] | 0.67 | 0.40 | 0.37 | — | — | — |
| NaCl | 2.5 | 1.5 | 1.39 | — | — | — |
| Talc | 0.42 | 0.25 | 0.23 | — | — | — |
| $Na_3PO_4 . 12H_2O$ | — | — | — | 1.2 | 1.2 | 1.2 |
| $CaCl_2 . 2H_2O$ | — | — | — | 0.69 | 0.69 | 0.69 |
| $CaCO_3$ | — | — | — | 0.067 | 0.067 | 0.067 |
| Naccanol NSRF[1] | — | — | — | 0.004 | 0.004 | 0.004 |
| A-Methylstyrene | 63 | 63 | 63 | 63 | 63 | 63 |
| Styrene | 5.8 | 5.8 | 5.8 | 5.8 | 5.8 | 5.8 |
| Acrylonitrile | 31.2 | 31.2 | 31.2 | 31.2 | 31.2 | 31.2 |
| Peroxide[1] | 0.232 | 0.232 | 0.232 | 0.232 | 0.232 | 0.232 |
| T, °C. | 100 | 100 | 100 | 100 | 100 | 100 |
| t, hrs. | 24 | 24 | 18 | 24 | 20 | 24 |
| Monomer/water ratios | 1.00 / 3.00 | 1.00 / 1.80 | 1.00 / 1.22 | 1.00 / 1.22 | 1.00 / 0.82 | 1.00 / 0.55 |
| Conversion % | 94 | 96 | 97 | 96 | 96 | 97 |

Table I-continued

| Example No: | 4 | 5 | 6 | 7 | 8 | 9 |
| --- | --- | --- | --- | --- | --- | --- |
| Mn | 43000 | 48000 | 52000 | 53000 | 56000 | 60000 |

Notes:
[1] PVA is polyvinyl alcohol; Naccanol NSRF is alkyl aryl sulfonate surfactant; Peroxide is 2,5-dimethyl-2,5-bis (benzoylperoxy) hexane.

It will be apparent from these data that the molecular weight of the product is markedly affected by the ratio of monomer phase to aqueous phase employed, with useful molecular weight products resulting at a monomer phase/aqueous phase ratio of about 1:1.5 or above.

EXAMPLES 10-13

A series of runs were carried out using the procedure of Example 3, but varying the ratio of monomers. The results are tabulated in Table II. The monomer amounts are in wt% of monomer mixture. The mixtures were run at monomer to water ratio of 1.00/0.67 (60 wt%).

Table II

| Example No: | 10 | 11 | 12 | 13 |
| --- | --- | --- | --- | --- |
| Monomers: | | | | |
| α-Methylstyrene | 63 | 65 | 66 | 69 |
| Acrylonitrile | 31.2 | 29 | 31.1 | 31 |
| Styrene | 5.8 | 6 | 2.9 | — |
| Conversion % | 97 | 99 | 98 | 97 |
| Molecular wt | 61,000 | 54,000 | 55,000 | 50,000 |

It will be seen from the data for Examples 10-13 that at a given ratio of monomer phase to aqueous phase, changes in monomer ratio effect minor changes in conversion and in molecular weight. From the data for Example 13, it will be apparent that useful polymeric products will also result when only α-methylstyrene and acrylonitrile are employed, provided that a high ratio of monomer phase to aqueous phase is used.

EXAMPLES 14-18

A series of runs were carried out using the following formulation:

| Demineralized water | 100 | parts by weight |
| --- | --- | --- |
| Na$_3$PO$_4$ . 12H$_2$O | 1.20 | |
| CaCl$_2$ . 2H$_2$O | 0.91 | |
| CaCO$_3$ | 0.067 | |
| Wetting Agent | 0.004 | |
| α-Methyl Styrene | 66.0 | |
| Styrene | 3.0 | |
| Acrylonitrile | 31.0 | |
| 2,5-diemethyl-2,5-bis (benzoylperoxy) hexane | 0.232 | |

These runs were carried out at the polymerization temperatures shown in Table III.

Table III

| Example No: | 14 | 15 | 16 | 17 | 18 |
| --- | --- | --- | --- | --- | --- |
| Polymerization T,°C. | 100 | 104 | 110 | 115 | 125 |
| Polymerization t, hrs[1] | 24 | 24 | 24 | 24 | 24 |
| Conversion % | >98 | 99 | >98 | >98 | >98 |
| Mn | 60,000 | 53,000 | 43,000 | 45,000 | 39,000 |
| Melt Index[2] | 1.04 | 1.89 | 2.34 | (5.1) | (21.5) |

Notes:
[1] time at the polymerization temperature.
[2] 410° F. condition A$_3$, g./3 min.; value for Example 17 calculated from condition A$_1$ data; value for Example 18 calculated from condition B$_1$ data.

It will be apparent from the data for Examples 14-18 that products with useful molecular weights, i.e. at or above about 40,000 (Mn) result only if the polymerization temperature is maintained in the range 100°-125° C. At lower temperatures reaction rates become too slow, and the final molecular weight becomes too high to be useful. At even higher temperatures, the trend to lower molecular weights results in products having molecular weights too low to be useful.

COMPARATIVE EXAMPLE

In U.S. Pat. No. 3,491,071, a process employing carefully controlled temperature staging during the polymerization step is disclosed. The patented process was employed with substantially the formulation of Examples 14-18, but employing 0.15 parts by weight ditertiary butyl peroxide as the initiator. The procedure followed was that set forth in Example III of the patent.

The suspension was prepared, stirred and heated to 112° C. as described in the patent, then gradually over a 9.5 hr. period to 150° C. Upon cooling, the reaction mass gelled, freezing the agitator. The mass was vacuum-dried for 16 hrs. at 100° C., to give a polymer having a molecular weight (Mn) of 28,500 and a melt index at 410° F., condition A$_3$ of too rapid to measure. The conversion based on recovery, was 85%.

It is thus clear that the controlled staging technique of the patent is not applicable to the preparation of polymers from monomer mixtures having a high level of alpha-methylstyrene. Only the process of this invention, wherein longer polymerization times at a single temperature in the range 100°-125° C. can be employed for the preparation of high molecular weight polymers in high conversion from such monomer mixtures by suspension polymerization.

Generally, the process of the instant invention will be seen to be characterized as a suspension polymerization process for the preparation of polymers of from 60 to 70 wt percent alpha methylstyrene, from 32 to about 29 wt percent acrylonitrile and from 0 to 7 wt percent styrene, wherein the polymerization is carried out at a temperature of from about 100° to about 125° C., for at least several hours and the ratio of monomer phase to aqueous phase is greater than about 1:1. Unlike prior art processes, the instant process produces high molecular weight polymers of good color and in high conversion without resorting to the use of expensive and time-consuming temperature programming, and the use of steam distillation and/or similar process steps to the reduce unreacted monomer content of the final product is unnecessary.

I claim:

1. A process for preparing alpha methylstyrene/acrylonitrile/styrene copolymers containing from 60 to 70 wt. percent alpha methylstyrene, from about 32 to about 29 wt. percent acrylonitrile and from 0 to 7 wt. percent styrene and having a number average molecular weight greater than about 40,000, comprising:
   providing an aqueous suspension including an aqueous phase, a suspending agent, a free radical polymerization initiator, and monomer mixture containing from about 60 to 70 wt. percent alpha methylstyrene, from about 32 to about 29 wt. percent acrylonitrile and from 0 to about 7 wt. percent styrene, said monomer mixture and said aqueous phase being present in a weight ratio of from about 1:1 to about 1:0.5;

heating said aqueous suspension to a polymerization temperature between about 100° C. and about 125° C.

holding said aqueous suspension at the polymerization temperature for at least several hours; and isolating said copolymer from aqueous suspension.

* * * * *